(12) United States Patent
Tanaka

(10) Patent No.: US 8,806,999 B2
(45) Date of Patent: Aug. 19, 2014

(54) DEBURRING SYSTEM, DEBURRING APPARATUS AND CUTTER BLADE

(75) Inventor: Norio Tanaka, Isesaki (JP)

(73) Assignee: Nihon Shoryoku Kikai Co., Ltd., Isesaki-shi (JP)

( * ) Notice: Subject to any disclaimer, the term of this patent is extended or adjusted under 35 U.S.C. 154(b) by 896 days.

(21) Appl. No.: 12/810,087

(22) PCT Filed: Dec. 27, 2007

(86) PCT No.: PCT/JP2007/075193
§ 371 (c)(1),
(2), (4) Date: Oct. 28, 2010

(87) PCT Pub. No.: WO2009/084093
PCT Pub. Date: Jul. 9, 2009

(65) Prior Publication Data
US 2011/0100178 A1  May 5, 2011

(51) Int. Cl.

| | | |
|---|---|---|
| *B26D 1/14* | (2006.01) | |
| *B26D 5/12* | (2006.01) | |
| *B26D 5/04* | (2006.01) | |
| *B26D 3/10* | (2006.01) | |
| *B25J 11/00* | (2006.01) | |
| *B29C 37/02* | (2006.01) | |
| *B25J 15/00* | (2006.01) | |
| *B26D 3/28* | (2006.01) | |
| *B26D 1/04* | (2006.01) | |
| *B26D 7/08* | (2006.01) | |
| *B26D 1/00* | (2006.01) | |
| *B26F 1/38* | (2006.01) | |
| *B26D 7/32* | (2006.01) | |
| *B26D 7/26* | (2006.01) | |

(52) U.S. Cl.
CPC ............... *B26D 1/0006* (2013.01); *B26D 5/12* (2013.01); *B26D 2001/0053* (2013.01); *B26D 5/04* (2013.01); *B26D 3/10* (2013.01); *B26D 2001/006* (2013.01); *B25J 11/006* (2013.01); *B26F 2210/06* (2013.01); *B26D 2001/0046* (2013.01); *B26F 1/38* (2013.01); *B26D 7/32* (2013.01); *B29C 37/02* (2013.01); *B25J 15/0066* (2013.01); *B26D 3/28* (2013.01); *B26D 7/2628* (2013.01); *B26D 2001/0066* (2013.01); *B26D 1/04* (2013.01); *B26D 7/086* (2013.01)
USPC ............... 83/162; 83/706; 409/297; 409/303; 409/345

(58) Field of Classification Search
USPC .................. 83/706, 956, 651, 914, 582, 162; 409/297, 303, 345
See application file for complete search history.

(56) References Cited

U.S. PATENT DOCUMENTS 2,972,035 A  *  2/1961  Miller .............................. 30/140
(Continued)

FOREIGN PATENT DOCUMENTS

DE        29903312 U1    9/1999
(Continued)

OTHER PUBLICATIONS

European Search Report dated Jul. 25, 2011, issued in corresponding European Patent Application No. 07860414.7.

(Continued)

*Primary Examiner* — Omar Flores Sanchez
(74) *Attorney, Agent, or Firm* — Westerman, Hattori, Daniels & Adrian, LLP

(57) ABSTRACT

There is provided a deburring system for enabling perfect automation of deburring with which burr of a resin molded article is substantially perfectly removed after the resin molded article is manufactured at low cost not by using an expensive resin molding machine, but by using a conventional general-purpose molding machine. Furthermore, there are provided a deburring apparatus and a cutter blade with which burr of a resin molded article having an unstable shape can be easily and cleanly removed from the root thereof without using any expensive control device and any positioning device and also without using any expensive copying device.

19 Claims, 20 Drawing Sheets

(56) References Cited

U.S. PATENT DOCUMENTS

| | | |
|---|---|---|
| 4,995,286 A | 2/1991 | Kobayashi et al. |
| 5,931,071 A * | 8/1999 | Mori ............................ 83/74 |
| 6,086,294 A * | 7/2000 | Danchine et al. ........... 409/132 |
| 7,093,525 B2 * | 8/2006 | Proffitt et al. ................ 82/46 |
| 7,704,023 B2 * | 4/2010 | Cheung et al. ............... 409/297 |
| 2003/0021861 A1 | 1/2003 | Yamada |
| 2006/0260451 A1 * | 11/2006 | Capodieci ...................... 83/34 |
| 2008/0011142 A1 * | 1/2008 | Cheung et al. ................. 83/776 |
| 2010/0257986 A1 * | 10/2010 | Borg et al. ..................... 83/13 |
| 2012/0111167 A1 * | 5/2012 | Gleason ........................ 83/162 |

FOREIGN PATENT DOCUMENTS

| | | |
|---|---|---|
| DE | 19918427 A1 | 10/2000 |
| DE | 20108446 U1 | 11/2002 |
| EP | 0295458 A2 | 12/1988 |
| EP | 1270166 A1 | 1/2003 |
| EP | 1825973 A1 | 8/2007 |
| JP | 59-156730 U | 10/1984 |
| JP | 61-107464 U | 7/1986 |
| JP | 61-175392 U | 10/1986 |
| JP | 63-288602 A | 11/1988 |
| JP | 3-55213 A | 3/1991 |
| JP | 6-36816 U | 5/1994 |
| JP | 2003-1639 A | 1/2003 |
| JP | 2003-1640 A | 1/2003 |
| JP | 2008-30251 A | 2/2008 |

OTHER PUBLICATIONS

Korean Office Action dated Mar. 21, 2012, issued in corresponding Korean Patent Application No. 10-2010-7014089.

Notification of Transmittal of Copies Translation of the International Preliminary Report on Patentability (Form PCT/IB/338) of International Application No. PCT/JP2007/075193 mailed Jul. 29, 2010 with Forms PCT/IB/373 and PCT/ISA/237.

International Search Report of PCT/JP2007/075193, mailing date of Apr. 15, 2008.

* cited by examiner

# DEBURRING SYSTEM, DEBURRING APPARATUS AND CUTTER BLADE

TECHNICAL FIELD

The present invention relates to a deburring system, a deburring device and a cutter blade for cutting burr formed on a partition line of a work such as resin molded article or the like.

BACKGROUND ART

With respect to resin molded articles such as bed parts for caring, copying machine parts, tool boxes, heat insulating resin boxes, air spoilers for vehicles, visors for vehicles, center pillars for vehicles, interior sheets for vehicles, etc., burr is formed, for example, on partition lines in a molding process. The burr is cut out by a deburring device after the mold process.

Various burr cutting methods such as cutting based on laser irradiation, blasts of hot air, flame application, plasma irradiation, infrared-ray irradiation, etc., cutting based on freezing brittle crushing using liquefied nitrogen, cutting based on various kinds of polishing (barrel-polishing, buffing, use of free abrasive grain, use of fixed abrasive grain), cutting using water jet, cutting using an ultrasonic cleaning system, cutting based on shot blast, cutting based on roller-crushing, cutting based on rub-off using a normal-temperature or heated metal piece, cutting using an acute-angled or obtuse blade, cutting based on punch press, etc. have been hitherto adopted in accordance with works or various conditions (For example, see Patent Document 1).
Patent Document 1: JP-UM-A-6-36816

DISCLOSURE OF THE INVENTION

Problem to be Solved by the Invention

However, with respect to the cutting based on infrared-ray irradiation and the cutting based on freezing brittle crushing, there are problems that surrounding base material is thermally and physically affected, high-precision control is required, and expensive facilities are required. Furthermore, with respect to the cutting based on various kinds of polishing, there are problems that works are restricted because this cutting is unsuitable for large-scale articles and also the inner surfaces of the works cannot be processed, cleaning is required in a post-process and minute secondary burr occurs. With respect to the cutting using water jet, there are problems that drying and water-treatment in a post-process are required, the price of facilities is increased, minute dust spatters, etc. With respect to the cutting based on use of the ultrasonic cleaning system, there are problems that drying in a post-process is required and this cutting is adaptable to neither large burr nor large works. With respect to the cutting based on shot blast, there are problems such as increase of the cost of the apparatus, restriction of the shapes of works, influence on surrounding base material, occurrence of powder dust, etc. With respect to the cutting based on roller-crushing, the cutting based on rub-off through friction using a normal-temperature or heated metal piece, etc., there are problems that these cutting methods are unsuitable for large burr, the burr cut-out surface gets rough and the precision is lowered. With respect to the acute-angled or obtuse blade, there are problems that position control is difficult, another care such as copying machining or the like is required, and if this care is not executed, the blade would bite into a work, so that the work is damaged or burr is insufficiently removed. With respect to the cutting based on punch press, an expensive mold is required, and it is difficult to change the design.

When the deburring system is perfectly automated, it is necessary to produce a completed product having no secondary burr after burr is removed by a deburring device. With respect to conventional deburring devices, it has been difficult to prevent occurrence of secondary burr, and thus the secondary burr has been removed by a hand work, which has disturbed perfect automation. Accordingly, development of techniques of suppressing occurrence of burr as much as possible at the headstream of a resin molding machine have been promoted. In this case, however, a developed molding machine is high in price, which causes increase of the cost of molded products.

Therefore, an object of the present invention is to provide a deburring system that can substantially perfectly remove burr of resin molded articles and enables perfect automation of deburring on the assumption that the resin molded articles are manufactured in low cost not by using any expensive resin molding machine, but by using a conventional general-purpose molding machine.

Furthermore, the present invention has an object to provide a burying apparatus and a cutter blade that can easily and finely cut out burr having an unstable shape from the root thereof without using expensive controller, work positioning device, etc., and also without using an expensive copying device.

Means of Solving the Problem

The present invention is characterized by comprising: a resin molding machine, a first mechanism for taking out a work from the resin molding machine and transferring the work onto a work receiving jig; a deburring device for removing burr of the work transferred onto the work receiving jig; and a second mechanism for taking out the deburred work from the work receiving jig, wherein the deburring device is a mechanism for feeding a cutter blade along the root of burr while vibrating the cutter blade, the cutter blade having a cutting edge portion corresponding to the root of the burr and a copying portion that corresponds to both face portions of the work and does not constitute a cutting edge, and the deburring device includes an urging mechanism for urging the cutter blade to the root of the burr while floating the cutter blade, and a vibration applying unit for vibrating the cutter blade in a predetermined direction by ultrasonic waves.

In this invention, the burr is cut out by the cutting edge portion under the state that the copying portion of the cutter blade abuts against the face portion of the work, whereby occurrence of burr (secondary burr) which newly occurs due to deburring is suppressed, and thus the handwork for removing secondary burr can be omitted. Accordingly, according to this invention, the resin molding machine can be permitted to generate some degree of burr. In general, occurrence of burr is problematic in the resin molding machine, and thus a metal mold which suppresses occurrence of burr as much as possible has been required. Therefore, the price of the molding machine is increased in accordance with the specification of the metal mold. According to the present invention, occurrence of secondary burr is suppressed, and thus perfect automation of deburring can be attained by using an inexpensive molding machine.

Furthermore, a deburring apparatus for cutting out burr by feeding a cutter blade along the root of the burr while vibrating the cutter blade is characterized in that the cutter blade has a cutting edge portion corresponding to the root of the burr and a copying portion which corresponds to a face portion of the work and does not constitute a cutting edge, and the deburring apparatus has an urging mechanism for urging the cutter blade to the root of the cutter blade while floating the cutter blade, a vibration applying unit for vibrating the cutter blade in a predetermined direction by ultrasonic waves.

In this invention, the urging mechanism urges the cutter blade to the root of the burr while floating the cutter blade, and the vibration applying unit vibrates the cutter blade in a predetermined direction by ultrasonic waves. Therefore, the cutter blade cuts out the burr by the cutting edge portion under the state that the copying portion abuts against the face portion of the work, whereby occurrence of burr (secondary burr) which would newly occur due to deburring is suppressed. Therefore, a handwork for removing the secondary burr can be omitted, and thus the perfect automation of deburring can be achieved.

Furthermore, a cutter blade for a deburring apparatus for cutting out burr of a work is characterized by comprising a cutting edge portion corresponding to the root of burr, and a copying portion which corresponds to a face portion of the work and does not constitute a cutting edge, wherein the tip position of the cutting edge of the cutting edge portion is located at the same position as a copying face constituting the copying portion or located to be farther away from the work than the copying face.

According to this construction, the tip position of the cutting edge of the cutting edge portion is located at the same position as the copying face constituting the copying portion or located to be farther away from the work than the copying face. Therefore, occurrence of breaking, etc. of the blade due to biting of the cutting edge portion into material can be suppressed.

Effect of the Invention

According to the present invention, the urging mechanism urges the cutter blade to the root of the burr while floating the cutter blade, and the vibration applying unit vibrates the cutter blade in a predetermined direction by ultrasonic waves. Therefore, the cutter blade cuts out the burr by the cutting edge portion under the state that the copying portion abuts against the face portion of the work. Therefore, occurrence of secondary burr can be suppressed, and the handwork for removing secondary burr can be omitted. Therefore, the perfect automation of deburring can be achieved. Furthermore, when the cutter blade is fed along the root of the burr to cut out the burr while vibrating the cutter blade, occurrence of breaking, etc. of the blade caused by biting of the cutting edge portion into the material can be suppressed, the lifetime of the cutting edge can be extended and also the capacity operating rate of the deburring apparatus can be enhanced.

Figure 1:
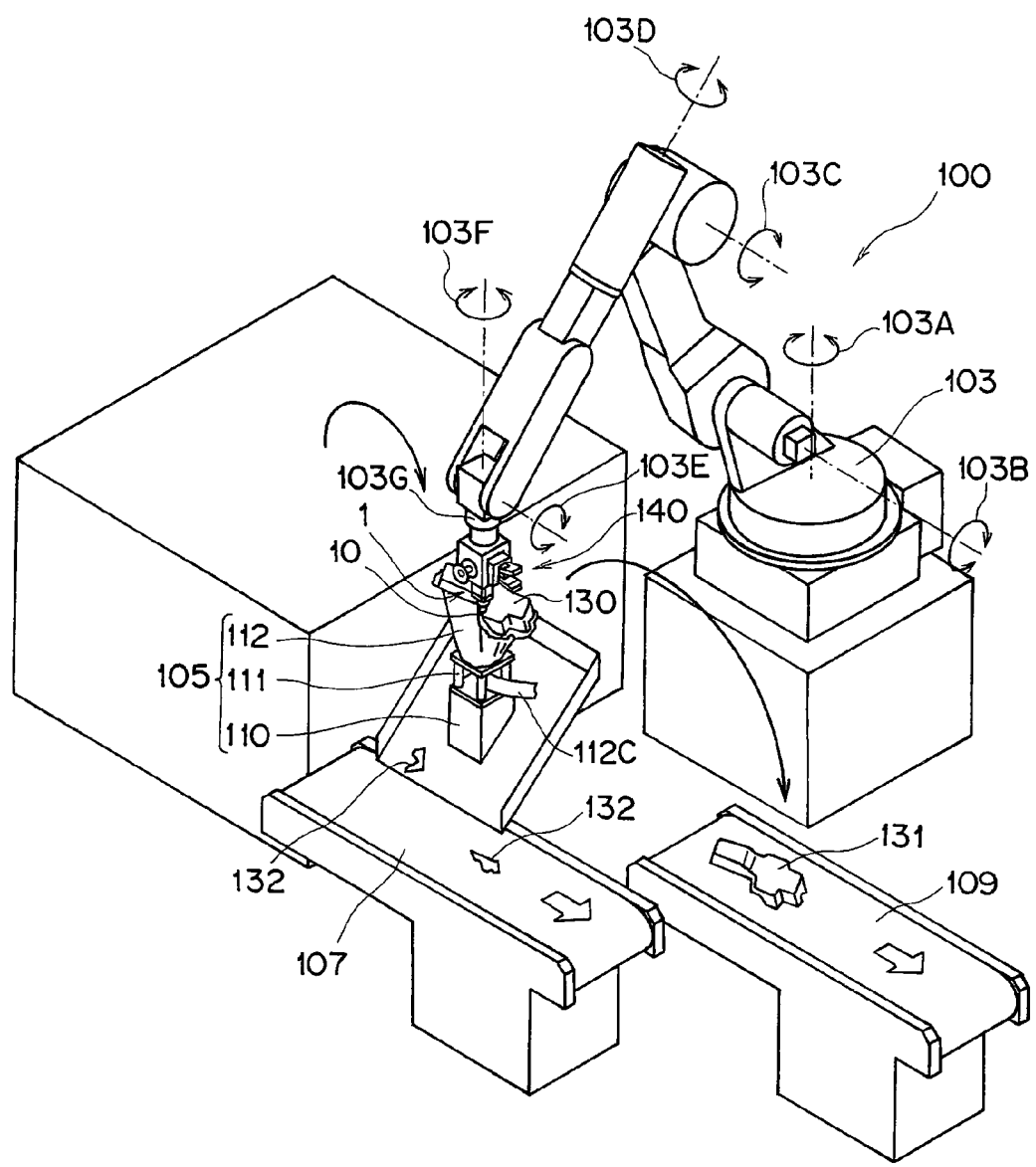
FIG. 1 is a perspective view showing an embodiment of a deburring system.

DESCRIPTION OF REFERENCE NUMERALS 1 deburring device
7 ultrasonic transducer
10, 101, 30, 40, 50, 60, 70 cutter blade
10A1, 10A2, 30A2, 70B1, 70B2, 70B3 smoothing portion
10A, 30A, 40A, 50A, 60A, 70A cutting edge portion
30B, 30B, 40B, 50B, 60B, 70B copying portion
100 deburring system
101 resin molding machine
103 multi-joint robot
105 work receiving mechanism
130 work

BEST MODES FOR CARRYING OUT THE INVENTION

An embodiment according to the present invention will be described hereunder with reference to the drawings.

FIG. 1 is a diagram showing an embodiment of a deburring system.

Figure 4:
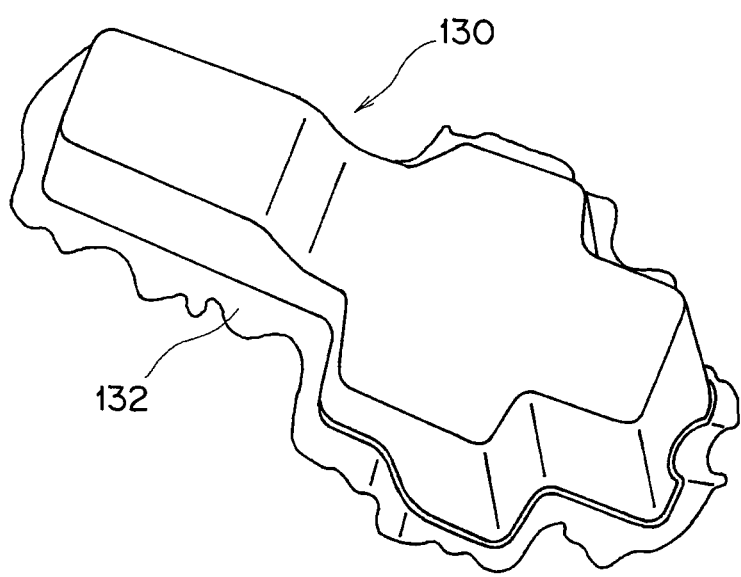
FIG. 4 is a perspective view showing an example of the shape of the work before deburring.
Figure 5:
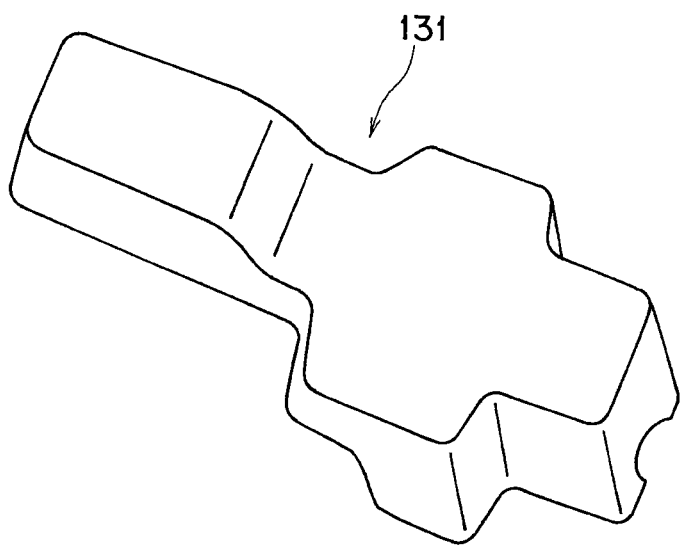
FIG. 5 is a perspective view showing an example of the work shape after deburring.

A deburring system 100 according to this embodiment has a so-called general-purpose resin molding machine 101 of hydraulic type or the like which cannot perfectly suppress occurrence of burr in a resin molding process, a hexaxial vertical multi-joint robot 103 having a work clamp device and a deburring device at the arm tip portion thereof, a work receiving mechanism 105 on which a work 130 (see FIG. 4) before deburring is mounted, a burr discharging conveyor 107 for discharging removed burr 132 to the outside of the system, and a completed article discharging conveyor 109 for discharging a work 131 (see FIG. 5) as a completed article after deburring to the outside of the system.

The multi-joint robot 103 has hexaxial joints 103A to 103F has a mechanism portion 140 which is secured to an arm tip portion 103G of the joint 103F at the cutting edge of the multi-joint robot 103 and constructed by integrating the work clamp device and the deburring device.

Figure 2:
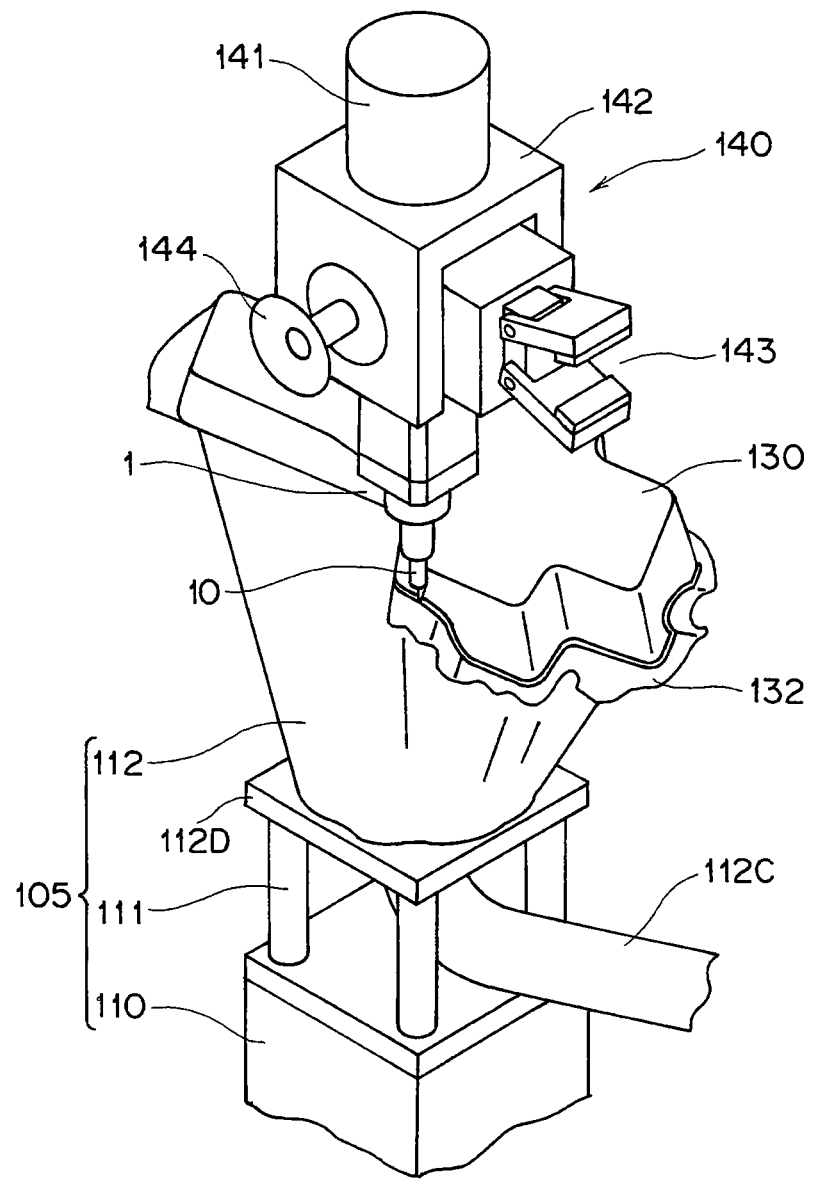
FIG. 2 is a perspective view showing a deburring operation of a work.

As shown in FIG. 2, the mechanism portion 140 has a cylindrical base portion 141 mounted on the arm tip portion 103G, a substantially U-shaped holder 142 intercommunicating with the base portion 141, a hand portion 143 which is disposed on a first surface of the holder 142 and used to clamp the work, and an adsorbing pad portion 144 which is mounted on a second surface of the holder 142 and used to adsorb the work. The adsorbing pad portion 144 is connected to a vacuum source through a connection hose (not shown). The work clamping hand portion 143 is operated by an air cylinder (not shown).

The deburring device 1 is secured to a third surface (lower surface in FIG. 2) of the holder 142, and a cutter blade having a flat-blade knife is fixed to the tip of the deburring device 1. The burr 132 of the work 130 on the work receiving mechanism 105 is removed by the cutter blade 10.

Figure 3:
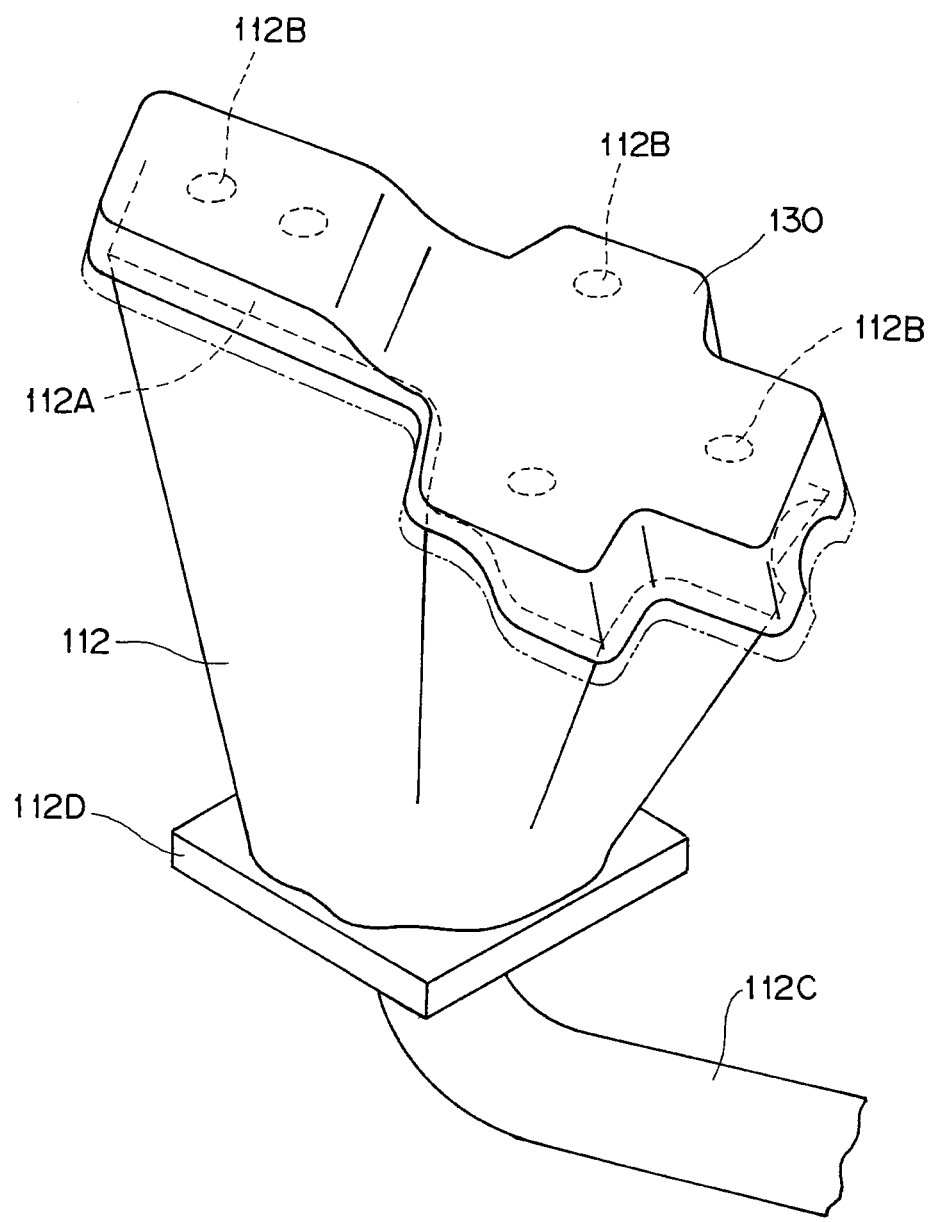
FIG. 3 is a perspective view showing a portion of a work receiving jig.

The work receiving mechanism 105 has a machine table 110, and a work receiving jig 112 which is connected to the machine table 110 through plural bolts 111, and as shown in FIG. 3, the work 130 is mounted on a work mount portion 112A at the upper portion of the work receiving jig 112 so that the work mount portion 112A is engagedly fitted in a recess portion of the work 130. The work 130 is mounted on the work mount portion 112A so as to drop in from a solid-line position to an imaginary-line position. Suction ports 112B for adsorption are formed in the work mount portion 112A, and connected to a vacuum source through a connection hose 112C. When the work 130 is mounted on the work mount portion 112A, the work 130 is fixed by suction. The shape of the work mount portion 112A is determined in accordance with the shape of the recess portion of the work 130, the shape of burr occurring on the work, etc., and it is set to at least such a shape that burr occurring on the work 130 can be removed by the cutting blade 10, that is, the deburring operation of the cutting blade 10 is not obstructed.

The work mount portion 112A has a support table 112D. When the shape of a work to be formed is changed due to mold exchange of the resin molding machine 101 or the like, the support table 112D and the other elements on the support table 112D are integrally exchanged by another work receiving jig 112 having a work mount portion 112A corresponding to the work shape. In this deburring system 100, tooling change is executed at the stage that the work receiving jig 112 is exchanged, and thus the setup time can be shortened.

Figure 6:
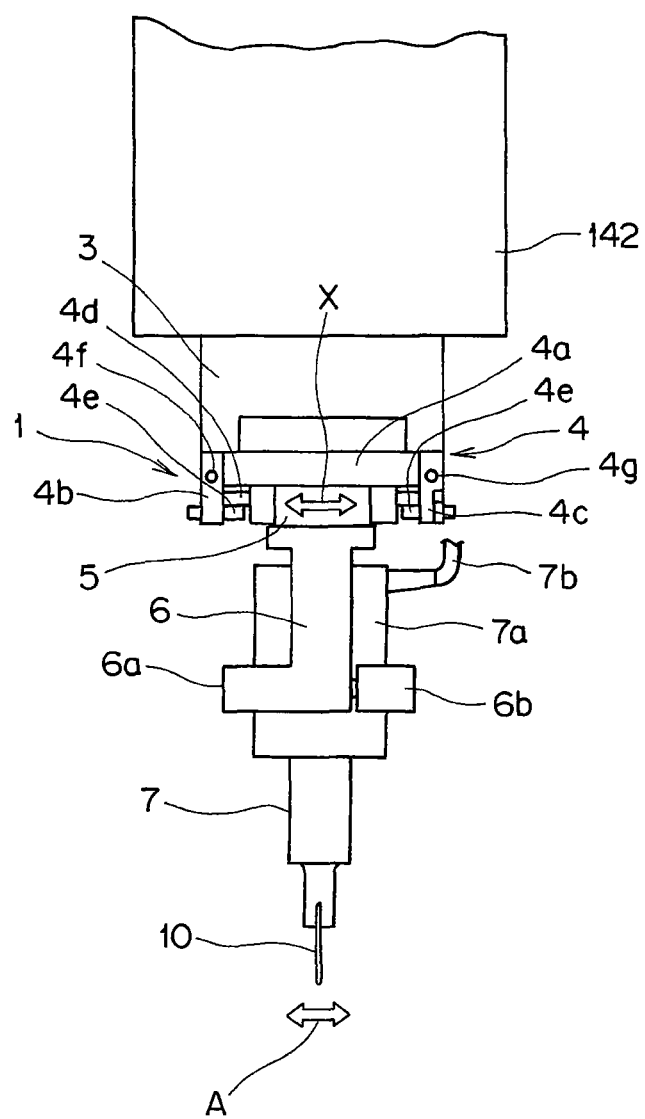
FIG. 6 is a front view showing an embodiment of a deburring device.

FIG. 6 shows the deburring device 1.

As described above, the deburring device 1 is secured to the third surface (the lower surface in FIG. 6) of the holder 142. The deburring device 1 has a support member 3 fixed to the third surface, and an air driving type slide table device 4 is fixed to the support member 3. The slide table device 4 has a fixing portion 4a fixed to the support member 3, support portions 4b and 4c fixed to both the ends of the fixing portion 4a, a shaft 4d provided between the support portions 4b and 4c, and a slide portion 5 which is freely slidable on the shaft 4d. The slide portion 5 is freely reciprocable in a predetermined linear direction (in a direction of an arrow X), and the linear direction is a direction along which the lower surface of the cutter blade 10 having a so-called flat-blade knife can be pressed against the work. 4e represents a stopper. An air support port 4f is provided to one support portion 4b, and an air discharge port 4g is provided to the other support portion 4c. A pressure adjuster (not shown) for adjusting the pressure of supply air is connected to the air supply port 4f.

Figure 7:
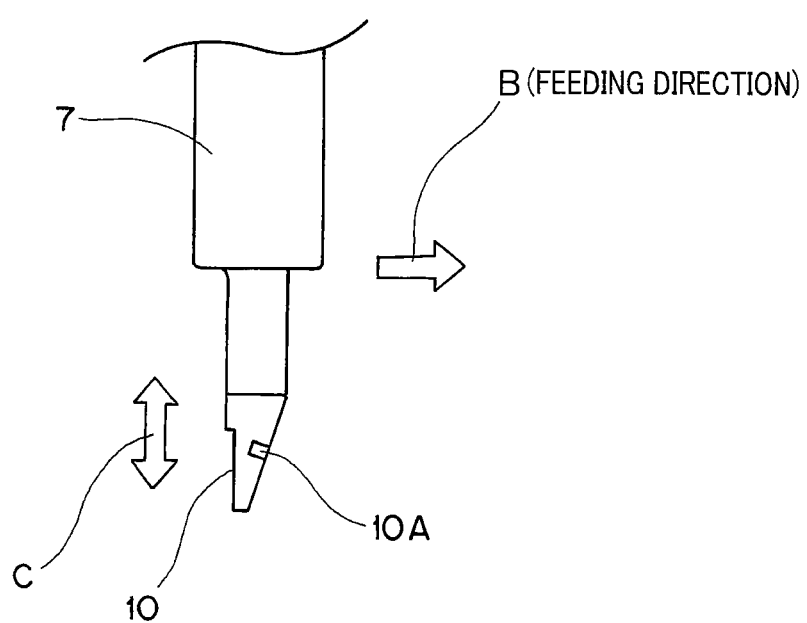
FIG. 7 is a side view showing a securing portion of a cutter blade.

One end of an ultrasonic transducer holder 6 is secured to the slide portion 5. A holder portion 6a which is designed in a semi-ring shape is formed at the other end of the ultrasonic transducer holder 6, and a cylindrical portion 7a of the ultrasonic transducer 7 is sandwiched between the holder portion 6a and another semi-ring-shaped holder portion 6b. The respective holder portions 6a and 6b are connected to each other by a bolt, whereby the ultrasonic transducer 7 is secured to the other end of the ultrasonic transducer 6. As shown in FIG. 7, the cutting blade 10 is fixed to the tip of the ultrasonic transducer 7. An ultrasonic unit (not shown) is connected to the ultrasonic transducer 7 through a code 7b (see FIG. 6). The ultrasonic transducer 7 is driven, and in accordance with the vibration of the ultrasonic transducer 7, the cutting blade 10 ultrasonically vibrates in a direction A (a direction of an arrow C) which is substantially perpendicular to a feeding direction (a direction of an arrow B) of the cutting blade 10. In this construction, the slide portion 5 is urged to the right side at all times until it is brought into contact with the right stopper 4e in FIG. 6 by air pressure from the air supply port 4f. when the cutter blade 10 comes into contact with the work and a load based on reactive force acts, the slide portion 5 slides to the left side on the shaft 4d against the air pressure in accordance with the degree of the load, whereby the cutter blade 10 is kept to be floated from the work. The sliding range is regulated by the left stopper 4e in FIG. 6. The slide table device 4 constitutes a floating mechanism, and the cutter blade 10 at the tip of the deburring device 1 is freely movable in the direction of the arrow A, that is, it is kept to be floated from the work (resin molded article).

Figure 8:
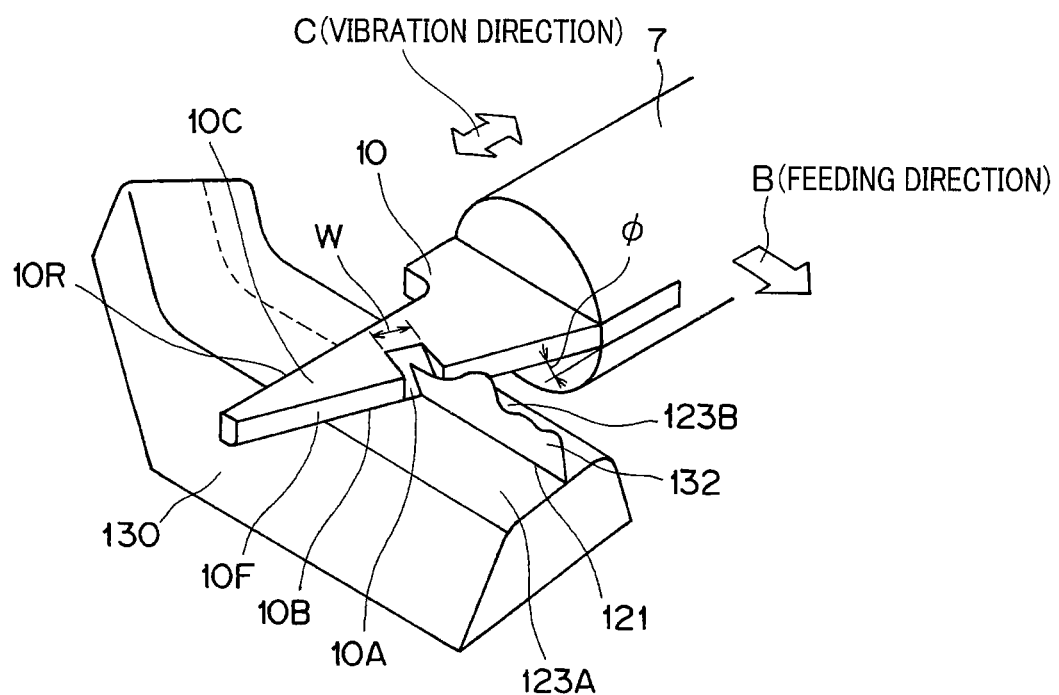
FIG. 8 is an enlarged perspective view showing a work deburring operation.

FIG. 8 shows the cutter blade 10 in the deburring operation.

The cutter blade 10 has a cutter blade main body portion 10C at the tip side, and the cutter blade main body portion 10C has a front end face 10F and a rear end face 10R. The rear enface 10R extends substantially in parallel to the extension line of the ultrasonic transducer 7, and the front end face 10F recedes from the extension line of the ultrasonic transducer 7 intersecting vertically to the feeding direction B by a recession angle φ. The cutter blade 10 is fixed to the ultrasonic transducer 7 by any method such as brazing or screwing. The cutter blade 10 comes into contact with the base portion (root) of burr 132, which is formed, for example, on a partition line 121 of the resin molded article as the work 130 (for example, parts of a bed for nursing care, parts of a copying machine, a tool box, a thermal insulation box, an air spoiler for a vehicle, a visor for a vehicle, a center pillar for a vehicle, an interior sheet for a vehicle, etc.) The front end face 10F of the cutter blade 10 has a cutting blade portion 10A having a width W of about several mm corresponding to the root of the burr 132, and a copying portion 10B having a curved surface which corresponds to the respective surface portions 123A, 123B of the work 130 and does not constitute a cutting blade. The width W of the cutting blade portion 10A generally ranges from about 0.6 mm to 1 mm, and it may be properly changed in accordance with the shape of burr formed on a work.

Figure 9:
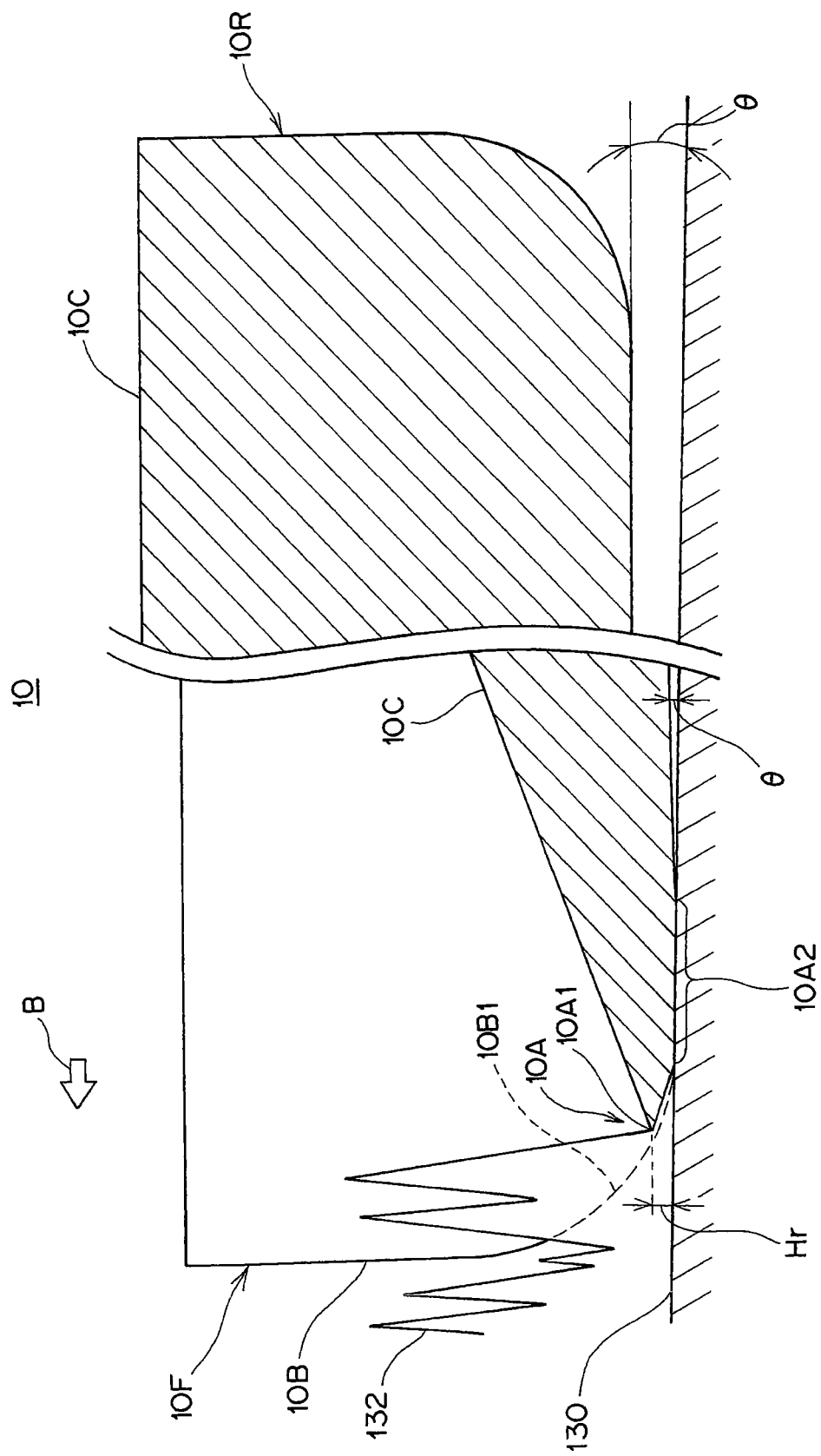
FIG. 9 is a cross-sectional view of a tip portion of the cutter blade according to a first embodiment.

FIG. 9 is a cross-sectional view containing the cutting blade portion 10A of the cutter blade.

The curved-surface-shaped copying portion 10B which corresponds to the respective surface portions 123A, 123B of the work 130 and does not constitute a cutting blade are formed on the front end face 10F of the cutter blade 10, and the copying portion 10B has an R curved-surface portion 10B1 having an R curved face in section at the lower portion thereof.

A cutting edge 10A1 formed at the edge portion of the cutting blade portion 10A (hatched portion) is set to the height position corresponding to a deburring height Hr, and the tip portion of the cutting edge 10A1 is formed so as to be located on a curved surface containing the R curved-surface portion 10B1 of the copying portion 10B or located at an inside position from the R curved surface portion 10B1 of the copying portion 10B (to be nearer to the center of curvature of the R curved surface portion than the R curved surface portion).

Accordingly, irrespective of the contact condition between the copying portion 10B and the work, or even when the shape of the work is unstable like a resin part or a curved-surface-shaped burr is cut out, the cutter blade 10 is prevented from excessively biting into the material, and thus occurrence of a trouble such as breaking of a blade or the like can be suppressed.

A smoothing portion 10A2 is formed at a slightly inner portion from the cutting edge 10A1 of the cutting blade portion 10A in the opposite direction to the feeding direction (the direction of the arrow B) of the cutter blade 10. The smoothing portion 10A2 is kept in contact with the work 130 under substantially fixed pressure dependent on the balance of the air pressure at the slide portion 5. Accordingly, the base portion of the remaining burr 132 which is left after the cutting of the cutting blade portion 10A is pressed to the work 130 side by the smoothing portion 10A2, thereby smoothing and flattening the neighborhood of the partition line 121 of the work 130. With respect to slender burr like thread (so-called thread burr), occurrence of the thread burr is suppressed by frictional heat in the smoothing operation of the smoothing portion 10A2.

Furthermore, a lower face 10C1 of the cutter blade main body portion 100 which is constructed as a further inner portion from the smoothing portion 10A2 of the cutter blade main body portion 100 is separated from the work 130 by a slight angle θ. The rear end surface 10R of the cutter blade is kept to be perfectly separated from the work 130.

As a result, only the portion of the cutter blade 10 which corresponds to the smoothing portion 10A2 comes into contact with the work 130, whereby the cutting blade portion 10A and the copying portion 10B can be prevented from floating up due to hitting to another portion.

Figure 10:
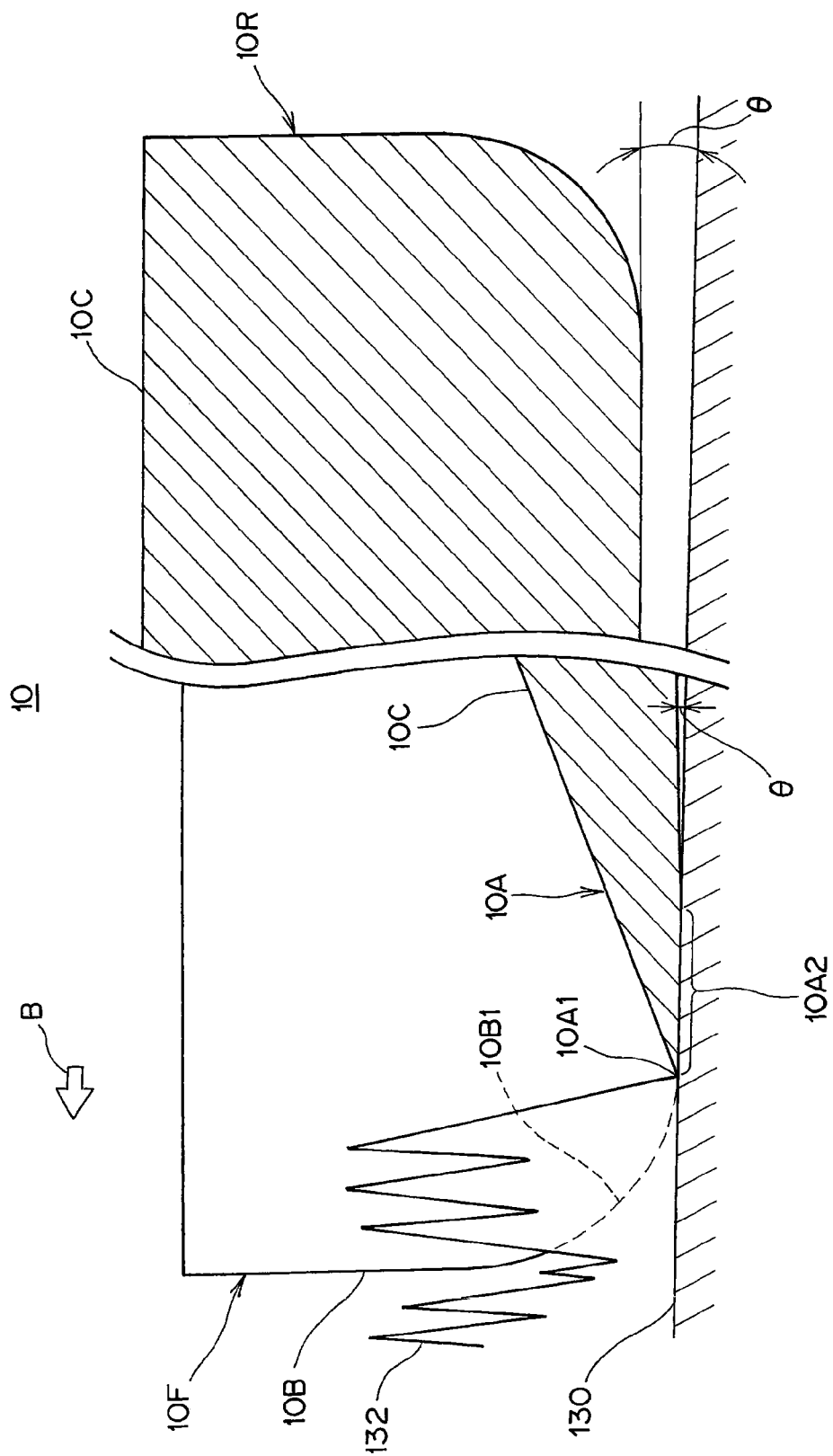
FIG. 10 is a cross-sectional view showing a tip portion of a cutter blade according to the first embodiment.

FIG. 10 shows another embodiment.

In this embodiment, the tip portion of the cutting edge 10A1 formed at the cutting edge portion of the cutting blade portion 10A (the hatched portion) extends to and terminates at the intersecting position between the R curved-surface portion 10B1 of the copying portion 10B formed on the front end face 10F of the cutter blade 10 and the lower surface of the cutter blade main body portion 100. That is, as compared with the above embodiment, the tip portion of the cutting edge 10A1 recedes till the intersecting position between the R curved surface portion 10B1 of the copying portion 10B and the lower surface of the cutter blade main body portion 100 in the opposite direction to the feeding direction (the direction of the arrow B) of the cutter blade 10.

With respect to the thus-constructed cutting blade portion 10A, the position of the tip portion of the cutting edge 10A1 is coincident with the lower surface of the cuter blade main body portion 100, so that the tip portion of the cutting edge 10A1 deeply bites into the root of the burr 132 and thus can remove the burr 132 from the root thereof.

Furthermore, irrespective of the contact condition between the copying portion 10B and the work, and further even when the shape of the work is unstable such as a resin article or burr formed in a curved-surface shape is cut out, the cutter blade 10 is prevented from excessively biting into the material, and occurrence of a trouble such as breaking of a blade or the like can be suppressed.

The lower surface of the cutting edge 10A1 of the cutting blade portion 10A extends in coincidence with the lower surface of the cutter blade main body portion 100, and the smoothing portion 10A2 is formed on the lower surface concerned. The smoothing portion 10A2 is kept in contact with the work 130 under substantially fixed pressure which is dependent on the balance of air pressure at the slide portion 5. Accordingly, the smoothing portion 10A2 presses the remaining base portion of the burr 132 cut by the cutting blade portion 10A against the work 130 side, and smoothes and flattens the neighborhood of the partition line 121 of the work 130. With respect to slender burr like thread (so-called thread burr), occurrence of the thread burr is suppressed by frictional heat in the smoothing operation of the smoothing portion 10A2.

Furthermore, a lower face 10C1 of the cutter blade main body portion 100 which is constructed as a further inner portion from the smoothing portion 10A2 of the cutter blade main body portion 100 is separated from the work 130 by a slight angle θ. The rear end surface 10R of the cutter blade is kept to be perfectly separated from the work 130.

As a result, only the portion of the cutter blade 10 which corresponds to the smoothing portion 10A2 comes into contact with the work 130, whereby the cutting blade portion 10A and the copying portion 10B can be prevented from floating up due to hitting to another portion.

Next, the deburring operation will be described.

When the deburring device 1 is operated, for example, an operator actually moves the arm of the multi-joint robot 103 once or several times to store route information corresponding to a moving route of the arm, thereby performing direct teaching. Or, there is used a method of automatically generating route information on the basis of shape information created by a design system such as a CAD system or the like by using a route automatic generating system. However, when the work 130 as an actual deburring target has large dispersion, the route information obtained by the direct teaching or the route automatic generating system does not necessarily represents an accurate route for each work 130 in the deburring operation. On the other hand, the deburring device 1 of this embodiment has the floating mechanism, and it can press the cutter blade 10 against the work under slightly higher press force than planned to perform deburring, and also copying control is executed, so that a work of correcting a taught position occurs hardly. Accordingly, the substantially processing time can be shortened.

In the deburring system 100 of this embodiment, as shown in FIG. 1, the multi-joint robot 103 takes out a pre-deburring work (resin molded article) 130 from the resin molding machine 101 by using the hand portion 143 shown in FIG. 2, and transfers the work onto the work receiving jig 105. Then, the multi-joint robot 103 removes the burr 132 of the work 130 on the work receiving jig 105 by using the cutter blade 10 of the deburring device 1 shown in FIG. 2. In this case, a resin tool box, a resin thermal insulation box, a resin part for a copying machine, a resin part for a vehicle, etc. are listed up as the work 130.

For such a work, the operation of the hexaxial joints 103A to 103F of the multi-joint robot 103 is controlled so that the orientation and operating direction of the cutter blade 10 of the arm tip portion 103G are optimized along the deburring route corresponding to burr-generated portions.

In this case, it is needless to say that the slide portion 5 of the arm tip portion 103G is kept to be floated from the work 130.

In this embodiment, when the arm tip portion 103G is driven on the basis of the route information obtained by direct teaching or the like, the press applied to the air supply port 4f is controlled, and the cutter blade 10 is pressed against the work 130 under predetermined pressure. The press applied to the air supply port is automatically switchable in accordance with the attitude of the cutter blade 10, and it is fixed at all times irrespective of the attitude of the cutter blade 10.

Under this state, the ultrasonic transducer 7 secured to the ultrasonic transducer holder 6 is driven to move the copying portion 10B along each of the surface portions 123A, 123B of the work 130 and feed the cutter blade 10 along the root of burr formed on the partition line (corresponding to deburring route) of the work 130 while the cutter blade 10 is vibrated at an amplitude of about 30 to 50 μm, whereby the burr is cut out and the deburred surface is smoothened at the same time.

According to this embodiment, burr of a resin molded article which is unstable in shape can be removed from the root thereof with using neither an expensive controller nor a work positioning device while the blade is prevented from biting into the main body of the resin molded article.

Finally, the multi-joint robot 103 takes out the deburred work 131 from the work receiving jig 105 by using the adsorbing pad portion 144 shown in FIG. 2, discharges the deburred work 131 onto a finished article discharging conveyor 109, and then discharges the deburred work 131 to the outside of the system through the conveyor 109. The burr 132 removed by the deburring device 1 is discharged through a slant hopper 133 onto the burr discharging conveyor 107, and then discharged to the outside of the system.

According to this embodiment, a finished article 131 having no secondary burr can be produced after deburring in the deburring device 1.

Accordingly, the manual work of removing secondary burr which has been hitherto executed is not required, so that the perfect automation of the deburring system is possible and thus the cost of molded articles can be reduced. Furthermore, occurrence of burr caused by the resin molding machine 1 is permitted on the assumption of the perfect automation. Therefore, a conventional type general-purpose resin molding machine can be used and an expensive molding machine is not required, so that the cost of molded articles can be reduced.

The embodiment in which air is supplied to one support port 4f has been described with reference to FIG. 6. However, as another embodiment, the support ports 4f, 4g of the respective support portions 4b, 4c may be supplied with air, and can be independently controlled with keeping the balance in air pressure therebetween, thereby constructing a floating mechanism. In this case, for example, an electropneumatic regulator (not shown) or the like may be connected to each of the supply ports 4f, 4g so that the pressure of air supplied to each of the supply ports 4f, 4g is continuously controlled every supply port 4f, 4g.

In this construction, for example when the tool weight acts as a load due to tool attitude, the tool weight is cancelled and the control is performed. when the direct teaching of the multi-joint robot 103 is executed, data concerning the tool attitude may be simultaneously input to a computer, and the electropneumatic regulator (not shown) may be controlled according to an electrical signal from the computer in the deburring operation to continuously control the air pressure. Accordingly, when the tool weight acts as a load due to tool attitude, the pressure of air supplied to the air supply ports 4f, 4g can be automatically adjusted in accordance with the tool attitude in order to cancel the tool weight.

[2] Second Embodiment

Next, a second embodiment of the cutter blade will described.

Figure 11:
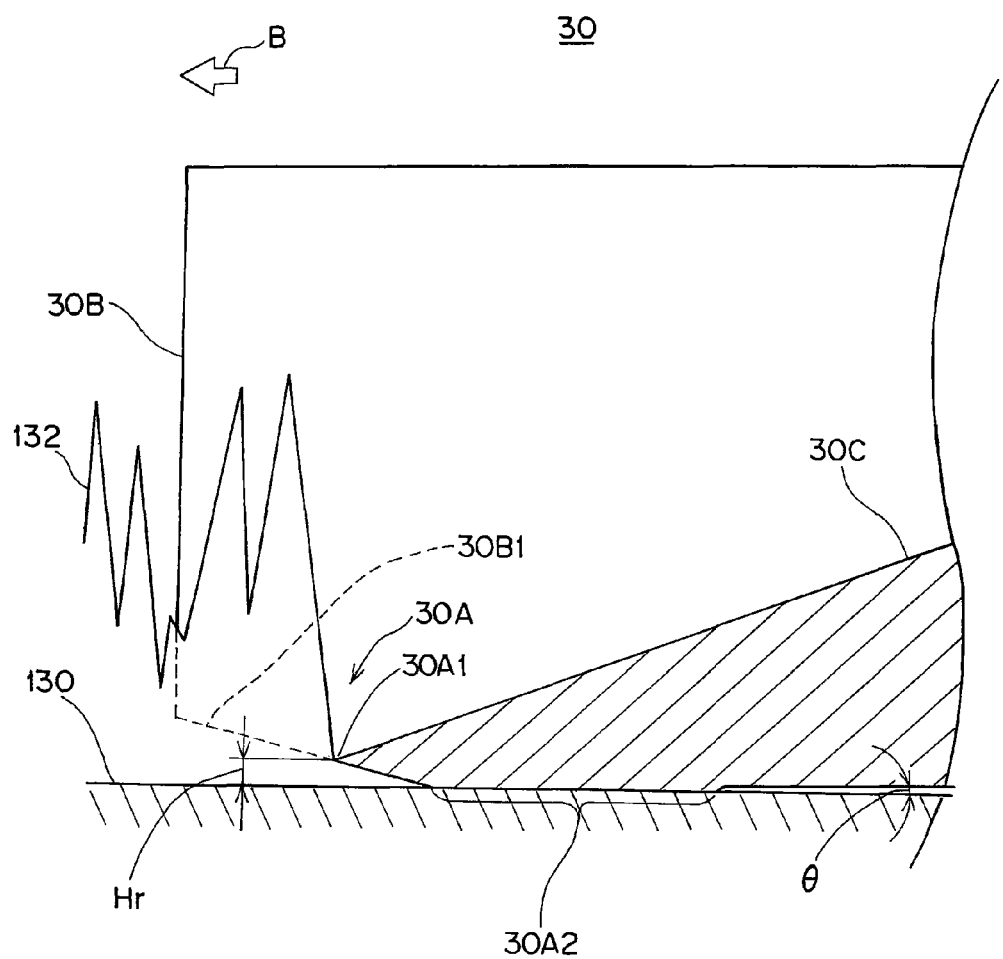
FIG. 11 is a cross-sectional view of a tip portion of a cutter blade according to a second embodiment.

As shown in FIG. 11, a cutter blade 30 has a front end face 30F corresponding to the front end face 10F of the first embodiment, and a rear end face (not shown), and also it has a cutting edge portion 30A which corresponds to the root of burr 132 and has a width of about several mm, a copying portion 30B having a curved-surface shape which corresponds to the respective surface portions 123A, 123B (see FIG. 8) of the work 13 and does not constitute a cutting blade, and a cutter blade main body portion 30C. The copying portion 30B has a slant portion 30B1 at the lower portion thereof, and the cutting edge 30A1 formed at the edge of the cutting edge portion 30A is provided at the position corresponding to a deburring height Hr, and the tip portion of the cutting edge 30A1 is located on the plane containing the slant surface portion 30B1 of the copying portion 30B. In this construction, the cutter blade 30 can be prevented from excessively biting into the material and occurrence of a trouble such as breaking of the blade or the like can be suppressed irrespective of a condition that the copying portion 30B comes into contact with the work, even when the shape of the work is unstable such as a resin part or even when burr having a curved-surface shape is cut out.

As in the case of the first embodiment, a smoothing portion 30A2 is formed at a slightly backside portion of the cutting edge 30A1 of the cutting edge portion 30A in the opposite direction to the feeding direction (the direction of an arrow B) of the cutter blade 30. The smoothing portion 30A2 is kept in contact with the work 130 under substantially fixed pressure which is dependent on balance of air pressure at the slide portion 5. The smoothing portion 30A2 pushes a remaining base portion of burr 132 cut by the cutting blade portion 30A to the work 130 side to smoothen the neighborhood of the partition line 121 of the work 130.

Furthermore, a lower surface of the cutter blade main body portion 30C which is formed as a further backside portion of the smoothing portion 30A2 of the cutter blade main body portion 30C is inclined by a slight angle of θ so as to be separated from the work 130. The rear end surface (not shown) of the cutter blade 30 is kept to be perfectly separated from the work 130. Accordingly, as in the case of the first embodiment, frictional resistance can be prevented from increasing more than necessary in the deburring work, and a load, and thus, power consumption in the deburring work can be reduced.

Figure 12:
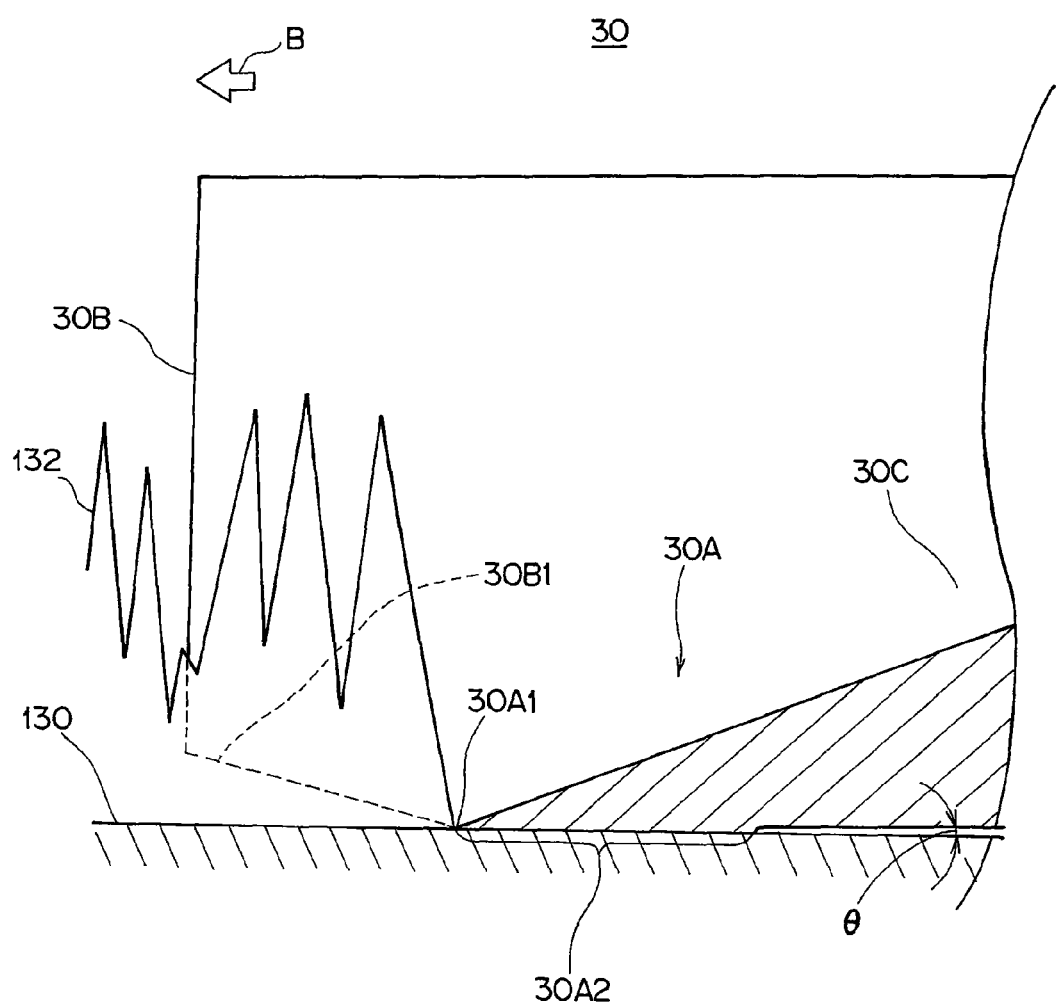
FIG. 12 is a cross-sectional view of the tip portion of the cutter blade.

FIG. 12 shows another embodiment.

In this embodiment, the tip portion of the cutting edge 30A1 formed at the cutting edge of the cutting edge portion 30A (hatched portion) extends to and terminates at the position at which the slant surface portion 30B1 of the copying portion 30B formed on the front end surface 30F of the cutter blade 30 intersects to the lower surface of the cutter blade main body portion 30C. That is, as compared with the above-described embodiment, the tip portion of the cutting edge 30A1 recedes in the opposite direction to the feeding direction (the direction of the arrow B of the cutter blade 30 till the intersection position between the slant surface portion 30B1 of the copying portion 30B and the lower surface of the cutter blade main body portion 30C.

In the cutting edge portion 30A of this construction, the position of the tip portion of the cutting edge 30A1 is coincident with the lower surface of the cutter blade main body portion 30C, and thus the top portion of the cutting edge 30A1 can deeply bite into the root of the burr 132, and remove the burr 132 from the root thereof.

Furthermore, irrespective of the contact condition between the copying portion 30B and the work, and further even when the shape of the work is unstable such as a resin article or burr formed in a curved-surface shape is cut out, the cutter blade 30 is prevented from excessively biting into the material, and occurrence of a trouble such as breaking of a blade or the like can be suppressed.

The lower surface of the cutting edge 30A1 of the cutting edge portion 30A extends in coincidence with the lower surface of the cutter blade main body 30C, and the smoothing portion 30A2 is formed on the lower surface concerned. The smoothing portion 30A2 is kept in contact with the work 130 under substantially fixed pressure which is dependent on the balance of the air pressure at the slide portion 5. Accordingly, the smoothing portion 30A2 pushes the remaining base portion of the burr 132 cut by the cutting edge portion 30A to the work 130 side to smooth the neighborhood of the partition line 121 of the work 130.

With respect to slender burr like thread (so-called thread burr), occurrence of the thread burr is suppressed by frictional heat in the smoothing operation of the smoothing portion 30A2.

The lower surface 30C1 of the cutter blade main body portion 30C which is located at a further backside portion of the smoothing portion 30A2 of the cutter blade main body portion 30C is inclined by a slight angle θ so as to be separated from the work 130, and the rear end surface 30R of the cutter blade 30 is kept to be perfectly separated from the work 130.

As a result, only the smoothing portion 30A2 of the cutter blade 30 is brought into contact with the work 130, so that the cutting edge portion 30A and the copying portion 30B can be prevented from abutting against the other portions and thus floating.

[3] Third Embodiment

Figure 13:
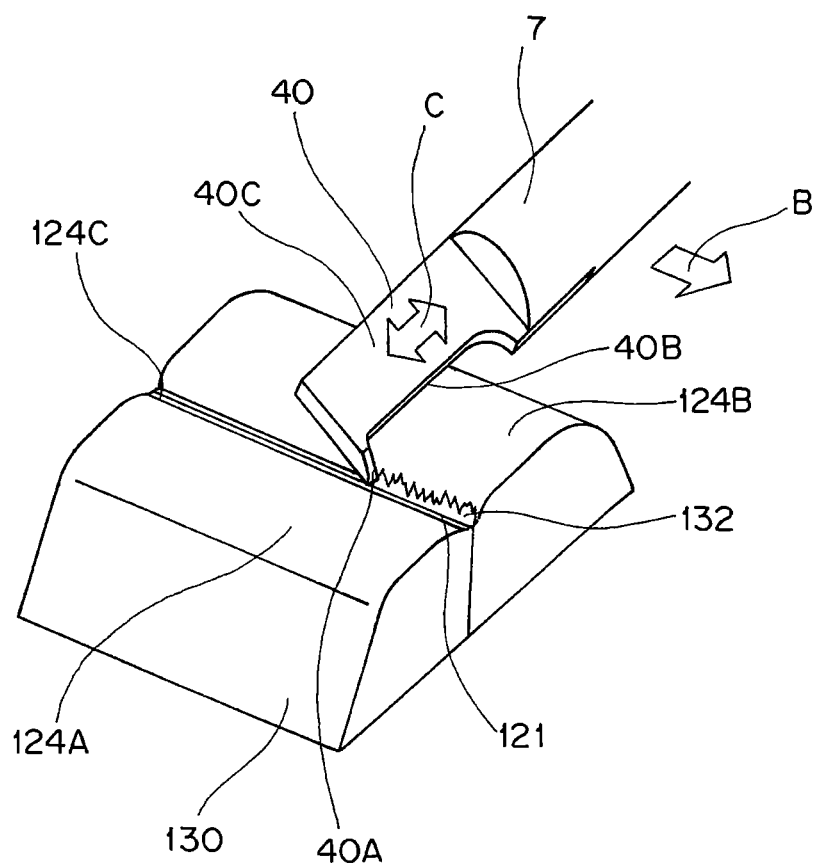
FIG. 13 is an enlarged perspective view showing a securing portion of a cutter blade according to a third embodiment when the deburring operation is executed.

As shown in FIG. 13, a cutter blade 40 abuts against the base portion (root) of burr 132 formed on a partition line 121 located at a valley portion 124C sandwiched between mountain portions 124A and 124B of a work 130. The tip portion of the cutter blade 40 is provided with a cutting edge portion 40A having a width of several mm which is projected so as to correspond to the root of the burr 132, a copying portion 40B having a curved-surface shape which corresponds to the mountain portion 124A or 124B of the work 130 (the mountain portion 124B in FIG. 13) and does not constitute a cutting edge, and a cutter blade main body portion 40C. In the cutter blade 40 of the third embodiment, the cutter blade main body portion 40C overrides the mountain portion 124B under the state that the copying portion 40B is brought into slidable contact with the mountain portion 124B, and the cutting edge portion 40A abuts against the burr 132 formed at the valley portion 124C.

In this embodiment, as in the case of the first embodiment, the cutter blade 40 is pressed against the work 130 under predetermined pressure, and at the same time the ultrasonic transducer 7 secured to the ultrasonic transducer holder 6 is driven, whereby the copying portion 40B is slid along the mountain portion 124B while the cutter blade 40 is vibrated. Accordingly, the burr formed on the partition line (corresponding to the deburring route) of the work 130 is cut out by the cutter blade 40 while the cutter blade 40 is fed along the root of the burr, and at the same time the deburred surface is smoothed. In the third embodiment, the burr formed at the valley portion of a resin molded article which is unstable in shape can be removed from the root without biting of the blade into the main body of the resin molded article.

[4] Fourth Embodiment

Figure 14:
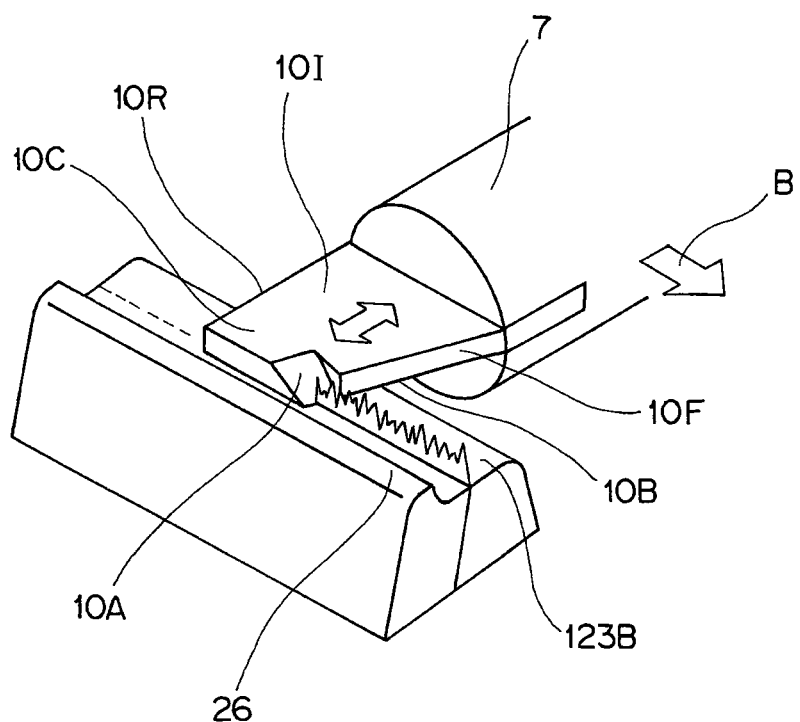
FIG. 14 is an enlarged perspective of a securing portion of a cutter blade according to a fourth embodiment when the deburring operation is executed.

As shown in FIG. 14, a cutter blade 10I has a cutting edge portion 10A having a width of several mm which is projected so as to correspond to the root of burr 132, a copying portion 10B having a curved-surface shape which corresponds to the surface portion 123B of the work 130 and does not constitute a cutting edge, and a cutter blade main portion 10C. The cutting edge portion 10A is formed at the tip of the cutter blade 10I, and there does not exit any copying portion at the tip of the cutter blade 10I as compared with the first embodiment. The fourth embodiment is applied to a case where the work 130 has a wall portion 26 in parallel to the portion at which the burr 132 is formed. The cutting edge portion 10A of the cutter blade 10I abuts against the base portion (root) of the burr 132 formed on the partition line 121 of the work 130 having the wall portion 26 to remove the burr 132. The operation of the cutter blade 10I is the same as the first embodiment, and even when the work 130 has the wall portion 26, the burr formed at the valley portion of a resin molded article having an unstable shape can be removed from the root thereof without biting of the blade into the main body of the resin molded article.

[5] Fifth Embodiment

Figure 15:
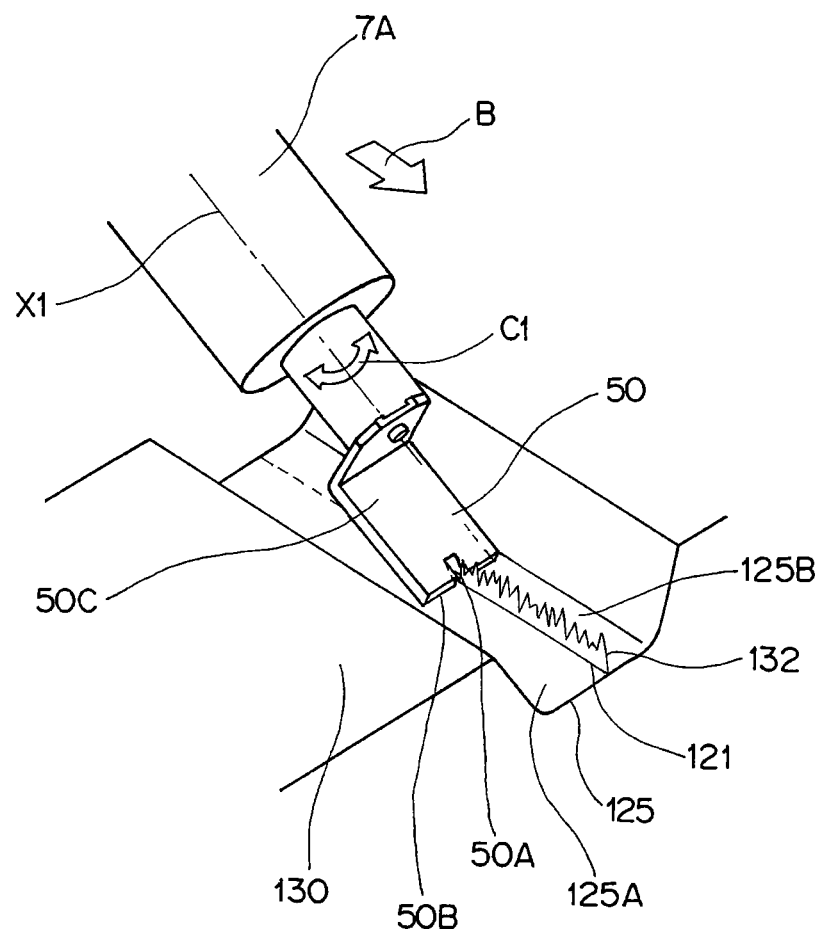
FIG. 15 is an enlarged perspective view showing a cutter blade fixing portion of a fifth embodiment.

As shown in FIG. 15, a cutter blade 50 is fixed to the tip of the ultrasonic transducer 7A, and the cutter blade 50 is rotated in a direction of an arrow C1 (torsional ultrasonic vibration) along a rotational axis X1.

In the fourth embodiment, the cutter blade 50 has a cutting edge portion 50A which corresponds to the root of the burr 132 and has a width of about several mm, a copying portion 50B having a curved-surface-shaped end face which correspond to each of face portions 125A and 125B of a groove portion 125 of the work 130 and does not any cutting edge, and a cutter blade main body portion 50C. The cutting edge portion 50A abuts against the base portion (root) of the burr 132 on the partition line 121 located in the groove portion 125 of the work 130.

The arrangement relationship between the cutting edge portion 50A and the copying portion 50B is the same as the first embodiment or the second embodiment.

In the fifth embodiment, when the arm tip portion 103G is driven on the basis of rout information obtained by direct teaching or a route automatically generating system, the pressure applied to each air supply port is controlled so that the cutter blade 50 is pressed against the work 130 under predetermined pressure.

Under this state, the ultrasonic transducer 7A is driven, and the copying portion 50B is slid along the face portions 125A and 125B while the cutter blade 50 is torsionally vibrated, whereby the cutter blade 50 is fed along the root of the burr 132 formed on the partition line (corresponding to the deburring route) of the work 130 to remove the burr, and at the same time the deburred surface is smoothed. The burr formed in the groove portion of the resin molded article can be removed from the root thereof without biting of the blade into the main body of the resin molded article.

[6] Sixth Embodiment

Figure 16:
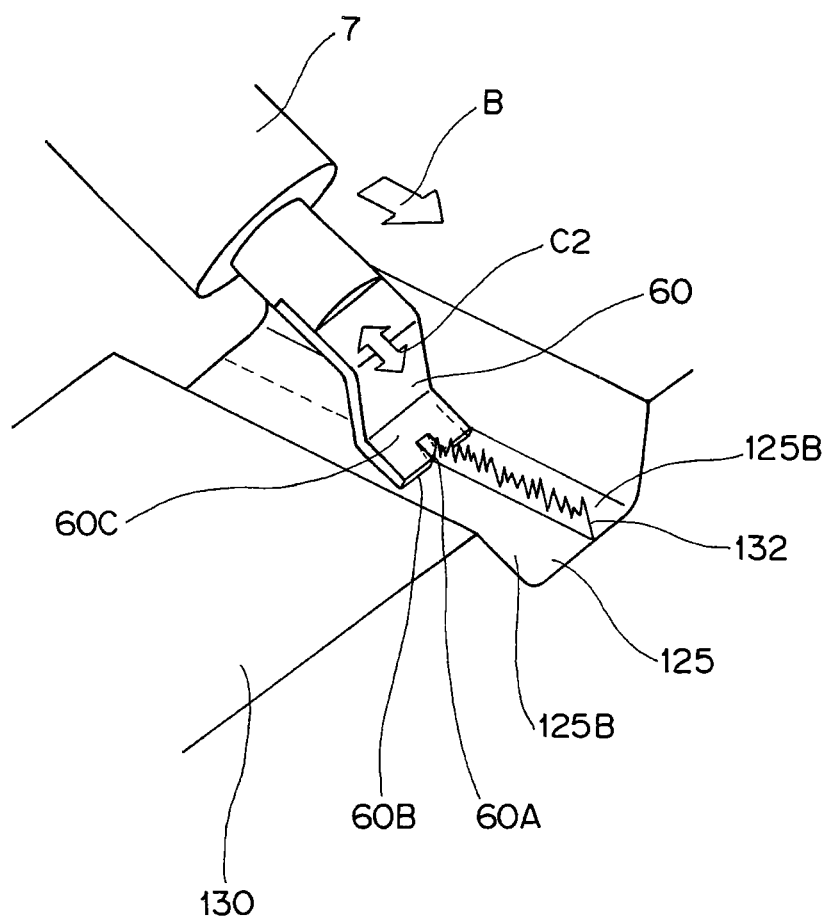
FIG. 16 is an enlarged perspective view showing a cutter blade fixing portion of a sixth embodiment.

In the first to fourth embodiments, the ultrasonic vibration is executed so that the vibration direction of the ultrasonic transducer is substantially perpendicular to the feeding direction (the direction of the arrow B) of the cutter blade. However, in a sixth embodiment, the vibration direction of the ultrasonic transducer has a feeding direction (the direction of the arrow B) component. That is, as shown in FIG. 16, a cutter blade 60 is fixed to the tip of the ultrasonic transducer, and the cutter blade 60 is ultrasonically vibrated (linearly vibrated) in the direction of an arrow C2 in accordance with the vibration of the ultrasonic transducer 7. The cutter blade 60 has a cutting edge portion 60A which corresponds to the root of the burr 132 and has a width of about several mm, a copying portion 60b having a curved-surface-shaped end face which corresponds to the respective face portions 125A and 125B of the groove portion 125 of the work 130 and does not constitute any cutting edge, and a cutter blade main body portion 60C. The cutting blade 60A abuts against the base portion (root) of the burr 132 on the partition line 121 located in the groove portion 125 of the work 130. The arrangement relationship between the cutting edge portion 60A and the copying portion 60B is the same as the first embodiment and the second embodiment.

In the sixth embodiment, when the arm tip portion 103G is driven on the basis of rout information obtained by direct teaching or a route automatically generating system, the pressure applied to each air supply port is controlled so that the cutter blade 50 is pressed against the work 130 under predetermined pressure.

Under this state, the ultrasonic transducer 7 is driven, and the copying portion 60B is slid along the face portions 125A and 125B while the cutter blade 50 is torsionally vibrated, whereby the cutter blade 60 is fed in the direction of the arrow B along the root of the burr 132 formed on the partition line (corresponding to the deburring route) of the work 130 to remove the burr, and at the same time the deburred surface is smoothed. According to the fifth embodiment, the burr formed in the groove portion of the resin molded article can be removed from the root thereof without biting of the blade into the main body of the resin molded article.

[7] Seventh Embodiment

Figure 17:
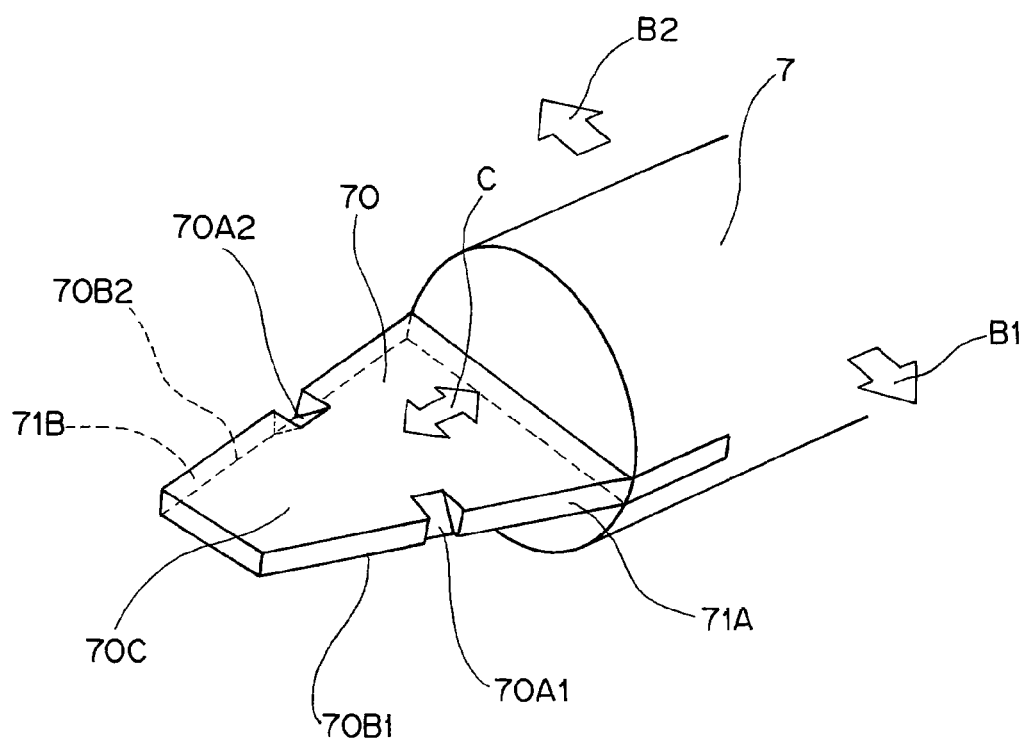
FIG. 17 is an enlarged perspective view showing a cutter blade fixing portion of a seventh embodiment.

In each of the embodiments described above, one cutting edge portion is provided to the cutter blade. However, according to a seventh embodiment, plural (two in the seventh embodiment) cutting edge portions are provided to the cutter blade. As shown in FIG. 17, a cutter blade 70 is fixed to the tip of the ultrasonic transducer 7, and the cutter blade 70 is ultrasonically vibrated in a direction (the direction of an arrow C) substantially perpendicular to the feeding direction of the cutter blade 70 (the direction of an arrow B1 or the direction of an arrow B2) in accordance with the vibration of the ultrasonic transducer 7. An ultrasonic unit (not shown) having power consumption of several hundreds W is connected to the ultrasonic transducer 7, and the ultrasonic transducer 7 is driven by the ultrasonic unit concerned.

The cutter blade 70 has a first end face 71A and a second end face 71B. The first end face 71A side of the cutter blade 70 is provided with a first cutting edge portion 70A1 which corresponds to the root of burr (not shown) and has a width of about several mm, and a curved-surface-shaped first copying portion 70B1 which corresponds to each face portion of the work 130 and does not constitute any cutting edge. The second end face 71B side of the cutter blade 70 is provided with a second cutting edge portion 70A2 which corresponds to the root of burr (not shown) and has a width of about several mm, and a curved-surface-shaped second copying portion 70B2 which corresponds to each face portion of the work 130 and does not constitute any cutting edge. Furthermore, the cutter blade 70 has a cutter blade main body portion 70C.

In this construction, the cutter blade 70 is pressed against the work under predetermined pressure, the copying portion 70B1 or the copying portion 70B2 is moved in the feeding direction B1 or the feeding direction B2 along each face portion of the work while the cutter blade 70 is vibrated, the cutter blade 70 is fed along the root of the burr formed on the partition line (corresponding to the deburring route) of the work to cut out the burr, and at the same time the deburred surface is smoothed. According to the sixth embodiment, the burr of the resin molded article can be removed from the root thereof without biting of the blade into the main body of the resin molded article.

In the cutter blade 70, the switching operation in the feeding direction is more easily performed as compared with a case where only one cutting edge portion is provided, and the processing time can be shortened and the route information can be simplified.

The two cutting edge portions are provided to the cutter blade, however, three or more cutting edge portions may be provided to the cutter blade.

[8] Eighth Embodiment

The seventh embodiment is configured so that the cutter blade is directly fed in the opposite direction (the feeding directions B1, B2) on the same plane. However, in this seventh embodiment, not only the feeding direction, but also the copying face can be switched. As shown in 18, a cutter blade 70X is fixed to the tip of the ultrasonic transducer 7, and the cutter blade 70X is ultrasonically vibrated in a direction (the direction of an arrow C) substantially perpendicular to the feeding direction of the cutter blade 70X (the direction of an arrow B1 or the direction of an arrow B2) in accordance with the vibration of the ultrasonic transducer 7. An ultrasonic unit (not shown) having a power consumption of several hundreds W is connected to the ultrasonic transducer 7, and the ultrasonic transducer 7 is driven by the ultrasonic unit concerned.

Figure 18:
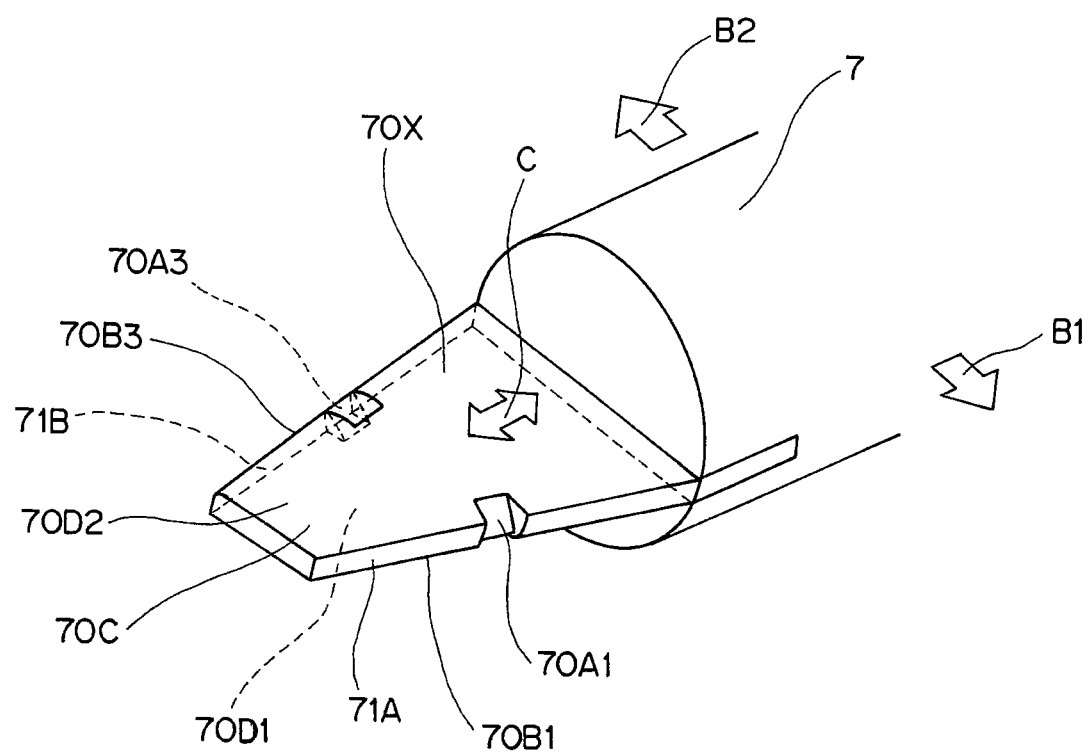
FIG. 18 is an enlarged perspective view showing a cutter blade fixing portion of an eighth embodiment.

The cutter blade 70X has a first end face 71A and a second end face 71B, and the first end face 71A side of the cutter blade 70X is provided with a first cutting edge portion 70A1 which corresponds to the root of burr (not shown) and has a width of about several mm, and a copying portion 70B1 which corresponds to each face portion of the work and does not constitute any cutting edge. The cutting edge of the first cutting edge portion 70A1 is located at the face 70D1 side (the lower surface side in FIG. 18) of the cutter blade 70X.

The second end face 71B side of the cutter blade 70 is provided with a second cutting edge portion 70A3 which corresponds to the root of burr (not shown) and has a width of about several mm, and a curved-surface-shaped second copying portion 70B3 which corresponds to each face portion of the work and does not constitute any cutting edge. The cutting edge of the second cutting edge portion 70A3 is located at the face 70D2 side of the cutter blade 70X (the upper surface side in FIG. 13). The cutter blade 70 has a cutter blade main body portion 70C.

In this construction, the cutter blade 70 is pressed against the work under predetermined pressure, the ultrasonic transducer 7 is driven and the copying portion 70B1 or the copying portion 70B3 is moved in the opposite direction B1 or the feeding direction B2 along each face portion of the work while the cutter blade 70X is vibrated.

That is, when the cutter blade 70X is fed in the feeding direction B1 along the root of burr formed on the partition plate (corresponding to the deburring route) of the work, the copying portion 70B1 or the copying portion 70B3 is moved along each face portion of the work, the burr is cut out by using the first cutting edge portion 70A1, and at the same time the deburred surface is smoothed. Furthermore, when the cutter blade 70X is fed in the feeding direction B2 along the burr formed on the partition line (corresponding to the deburring route) of the work, the copying portion 70B3 is moved along each face portion of the work, the burr is cut out by using the second cutting edge portion 70A3, and the deburred surface is smoothed.

According to the seventh embodiment, burr of a resin molded article which is unstable in shape can be removed from the root thereof with no biting of the blade into the main body of the resin molded article. According to this cutting blade 70X, when a work has a three-dimensional shape such as a ring-shaped work or the like, the switching of the feeding direction is easier as compared with a case where only one cutting edge is provided, and thus the processing work can be shortened and the route information can be simplified.

[9] Ninth Embodiment

Figure 19:
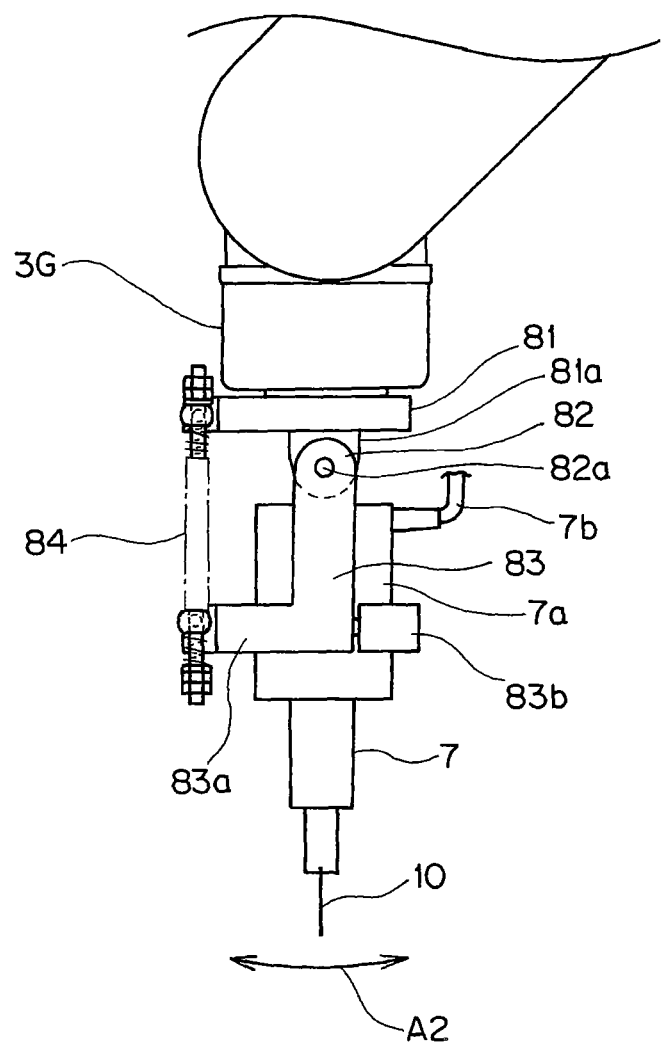
FIG. 19 is an enlarged view showing an arm tip portion according to a ninth embodiment.

FIG. 19 shows a ninth embodiment.

In this embodiment, a swing arm base 81 is directly secured to the arm tip portion 103G, and one end of a swing ultrasonic transducer holder 83 is swingably secured to a support piece 81a of the swing arm base 81 through a shaft 82a constituting a swing bearing portion 82. A semi-ring-shaped holder portion 83a is formed at the other end of the swing ultrasonic transducer holder 83. A cylindrical portion 7a of the ultrasonic transducer 7 is sandwiched between the holder portion 83a and another semi-ring holder portion 83b, and the holder portions 83a and 83b are joined to each other by a bolt, whereby the ultrasonic transducer 7 is secured to the other end of the swing ultrasonic transducer holder 83. The swing arm base 81 and the holder portion 83a of the swing ultrasonic transducer holder 83 are joined to each other by a coil spring mechanism 84. The coil spring mechanism 84 normally keeps the state shown in FIG. 19 over the whole length thereof. When the cutter blade 10 is swung counterclockwise (the pushing direction to the work) around the shaft 82a, the coil mechanism 84 extends over the whole length thereof. When the cutter blade 10 is swung clockwise (the separating direction from the work) around the shaft 82a, the coil mechanism 84 contracts over the whole length thereof to regulate the swing in the direction of the arrow A2, so that the floating state of the blade 10 is kept while the swing range of the cutter blade 10 is regulated.

According to the ninth embodiment, as compared with the first embodiment, the copying operation can be performed under the state that the cutter blade 10 is pressed against the work in a predetermined pressure range regardless of the simpler construction.

[10] Tenth Embodiment

Figure 20:
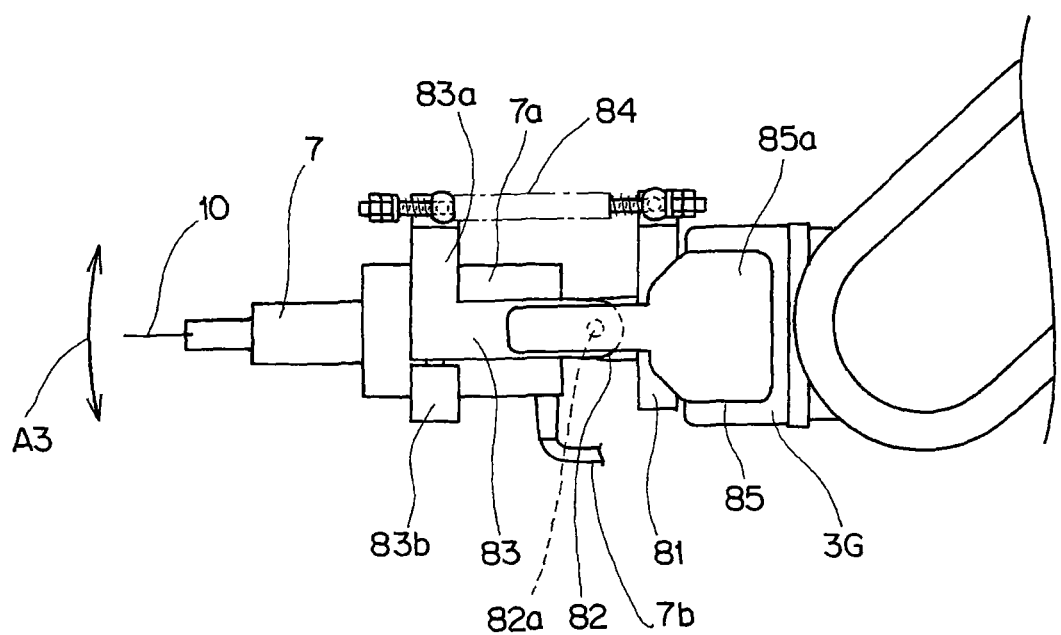
FIG. 20 is an enlarged view showing an arm tip portion according to a tenth embodiment.

A tenth embodiment is configured by adding a counter weight 85 to the ninth embodiment as shown in FIG. 20.

The counter weight 85 is integrally secured to the swing ultrasonic transducer holder 83, and freely swingable around the shaft 82a in the direction of an arrow A3 integrally with the transducer holder 83. The weight of the weight portion 85a of the counter weight 85 is set to be equal to the total weight of the swing ultrasonic transducer holder 83, the ultrasonic transducer 7 and the cutter blade 10 (specifically, the members at the left side of the shaft 82a in FIG. 19), and the counter weight 85 functions to cancel the rotational moment of the cutter blade 10 side when the arm tip portion 103G is horizontally driven.

According to this embodiment, as compared with the ninth embodiment, even when the arm tip portion 103G is horizontally driven, the copying operation can be performed while the press pressure to the work is kept within a predetermined range.

As described above, according to each of the embodiments, burr of a resin molded article which is unstable in shape can be removed from the root thereof with using neither an expensive control device nor a work positioning device and without occurrence of biting of a blade into the main body of the resin molded article. Furthermore, the burr can be removed cleanly, so that occurrence of powder dust can be suppressed, chips of burr which can be easily treated can be obtained and also the power consumption can be reduced. Still furthermore, the cut edge of burr is cleaned and the product's value is enhanced. When a work is a resin molded article, the present invention is applicable from relatively large burr till thread burr. The present invention is applicable to an inner surface having a three-dimensional shape insofar as a cutter blade can reach the inner surface.

The present invention has been described on the basis of the embodiments. However, the present invention is not limited to these embodiments. A resin molded article is used as a work. However, the work is not limited to the resin molded article, and the present invention may be likewise applied to a metal molded article of aluminum or the like. Furthermore, the cutter blade is designed in a cantilevered structure. However, the cutter blade may be designed in a double-side support structure by supporting the tip of the cutter blade by a spring or the like so that the vibration of the cutter blade is not disturbed.

The invention claimed is:

1. A deburring apparatus for cutting out burr by feeding a cutter blade along the root of the burr while vibrating the cutter blade is characterized in that the cutter blade has a cutting edge portion corresponding to the root of the burr and a copying portion which corresponds to a face portion of the work and does not constitute a cutting edge, and the deburring apparatus has an urging mechanism for urging the cutter blade to the root of the cutter blade while floating the cutter blade, a vibration applying unit for vibrating the cutter blade in a predetermined direction by ultrasonic waves.

2. The deburring apparatus according to claim 1, wherein the urging mechanism has a slide mechanism for supporting the cutter blade so that the cutter blade is slidable, and urges the cutter blade along a predetermined linear direction.

3. The deburring apparatus according to claim 1, wherein the urging mechanism has a swing mechanism for supports the cutter blade so that the cutter blade is swingable, and urges the cutter blade while swinging the cutter blade.

4. The deburring apparatus according to claim 1, wherein the copying portion of the cutter blade has a curved surface or a flat surface that can be brought into contact with a face portion of the work.

5. The deburring apparatus according to claim 1, wherein the vibration applying unit vibrates the cutter blade in a linear direction or a torsional direction.

6. A cutter blade for a deburring apparatus for cutting out burr of a work, characterized by comprising:
a cutting edge portion corresponding to the root of burr; and
a copying portion which corresponds to a face portion of the work and does not constitute a cutting edge, wherein the tip position of the cutting edge of the cutting edge portion is located at the same position as a copying face constituting the copying portion or located to be farther away from the work than the copying face.

7. The cutter blade according to claim 6, wherein the height of a cutting edge formed at the tip of the cutting edge portion is set to a height position corresponding to a deburring height Hr, and the tip portion of the cutting edge is located on a plane containing an R curved surface portion or slant surface portion of the copying portion, or located at the inside of the R curved surface portion or the slant surface portion.

8. The cutter blade according to claim 6, wherein the tip portion of the cutting edge formed at the tip portion of the cutting edge portion extends to and terminates at an intersecting position between an R curved surface portion or slant surface portion of the copying portion formed on a front end face of the cutter blade and a lower surface of a cutter blade main body portion.

9. The cutter blade according to claim 6, wherein a smoothing portion for smoothing a portion deburred by the cutting edge portion is provided at a rear side of the cutting edge portion in a feeding direction of the cutter blade.

10. The deburring apparatus according to claim 1, wherein the copying portion of the cutter blade has a surface that can be brought into contact with a face portion of the work.

11. The deburring apparatus according to claim 10, wherein the urging mechanism has a slide mechanism for supporting the cutter blade so that the cutter blade is slidable, and urges the cutter blade along a predetermined linear direction.

12. The deburring apparatus according to claim 10, wherein the urging mechanism has a swing mechanism for supports the cutter blade so that the cutter blade is swingable, and urges the cutter blade while swinging the cutter blade.

13. The deburring apparatus according to claim 10, wherein said surface of said copying portion has a curved surface or a flat surface that can be brought into contact with a face portion of the work.

14. The deburring apparatus according to claim 10, wherein the vibration applying unit vibrates the cutter blade in a linear direction or a torsional direction.

15. A deburring system characterized by comprising a resin molding machine, a first mechanism for taking out a work from the resin molding machine and transferring the work onto a work receiving jig, a deburring device for removing burr of the work transferred onto the work receiving jig, and a second mechanism for taking out the deburred work from the work receiving jig, wherein the deburring device includes a deburring apparatus according to claim 1.

16. The deburring system according to claim 15, wherein the urging mechanism has a slide mechanism for supporting the cutter blade so that the cutter blade is slidable, and urges the cutter blade along a predetermined linear direction.

17. The deburring system according to claim 15, wherein the urging mechanism has a swing mechanism for supports the cutter blade so that the cutter blade is swingable, and urges the cutter blade while swinging the cutter blade.

18. The deburring system according to claim 15, wherein said copying portion of the cutter blade has a curved surface or a flat surface that can be brought into contact with a face portion of the work.

19. The deburring system according to claim 15, wherein the vibration applying unit vibrates the cutter blade in a linear direction or a torsional direction.

\* \* \* \* \*